(12) United States Patent
Bergmann et al.

(10) Patent No.: US 7,182,525 B2
(45) Date of Patent: Feb. 27, 2007

(54) COUPLING UNIT FOR COUPLING AN OPTICAL TRANSMITTING AND/OR RECEIVING MODULE TO AN OPTICAL FIBER

(75) Inventors: Frank Bergmann, Berlin (DE); Andreas Stockhaus, Berlin (DE); Michael-Peter Pohnke, Berlin (DE); Andreas Steffensen, Kleinmachnow (DE)

(73) Assignee: Finisar Coproration, Sunnyvale, CA (US)

( * ) Notice: Subject to any disclaimer, the term of this patent is extended or adjusted under 35 U.S.C. 154(b) by 69 days.

(21) Appl. No.: 10/676,589

(22) Filed: Oct. 1, 2003

(65) Prior Publication Data

US 2004/0062492 A1  Apr. 1, 2004

(30) Foreign Application Priority Data

Oct. 1, 2002 (DE) ............................ 102 46 532

(51) Int. Cl.
*G02B 6/36* (2006.01)

(52) U.S. Cl. .................................................. 385/88

(58) Field of Classification Search ............. 385/53–94
See application file for complete search history.

(56) References Cited

U.S. PATENT DOCUMENTS

| 5,274,723 | A | * | 12/1993 | Komatsu | 385/92 |
| 6,491,447 | B2 | * | 12/2002 | Aihara | 385/92 |
| 6,607,309 | B2 | * | 8/2003 | Kuhn et al. | 385/93 |
| 6,793,406 | B1 | * | 9/2004 | Edwards et al. | 385/88 |
| 6,860,649 | B2 | * | 3/2005 | Edwards et al. | 385/92 |
| 7,036,998 | B2 | * | 5/2006 | Tonai et al. | 385/88 |

FOREIGN PATENT DOCUMENTS

| DE | 33 16 236 A1 | 8/1984 |
| DE | 38 34 394 A1 | 4/1990 |
| DE | 38 34 395 A1 | 4/1990 |

* cited by examiner

*Primary Examiner*—Sung Pak
*Assistant Examiner*—Tina M. Wong
(74) *Attorney, Agent, or Firm*—Workman Nydegger (57) ABSTRACT

The invention relates to a coupling unit for coupling an optical transmitting and/or receiving module to an optical fiber. The coupling unit has a connecting area that can be connected to a transmitting and/or receiving module, and a holding area that holds an optical fiber. A transparent coupling area is provided, which is formed as an integral component of the coupling unit, and via which light can be coupled directly between an optical fiber that is inserted into the holding area and a transmitting and/or receiving module that is coupled directly to it. The coupling area preferably has a matched refractive index. The coupling unit is preferably in the form of an injection-molded part.

18 Claims, 3 Drawing Sheets

COUPLING UNIT FOR COUPLING AN OPTICAL TRANSMITTING AND/OR RECEIVING MODULE TO AN OPTICAL FIBER

BACKGROUND OF THE INVENTION

FIELD OF THE INVENTION

The invention relates to a coupling unit for coupling an optical transmitting and/or receiving module to an optical fiber. The coupling unit is used for coupling a laser diode or receiving diode, which is arranged in a TO (Transistor Outline) can, to a mono-mode glass fiber.

It is known for an optical fiber that is arranged in an optical plug to be coupled to a transmitting and/or receiving module via a coupling unit. Light which emerges from the optical fiber is passed to the photosensitive surface of a receiving element, in particular a monitor diode, and light which is emitted from a transmitting element, in particular a laser diode, is injected into the optical fiber.

In order to keep reflections on the light inlet or light outlet surface of the optical fiber as low as possible, it is worthwhile to provide direct contact (physical contact) between the fiber core and an optical medium which has the same refractive index, or a similar refractive index, to that of the fiber core. Reflections in the order of magnitude of −15 dB are thus produced at the fiber/air junction. However, considerably better values, of −27 dB, are often required.

In order to provide a physical contact such as this, it is known for a highly polished glass fiber, which is adhesively bonded into a precise ceramic pin, to be incorporated in a coupling unit. One end surface of the highly polished glass fiber is used as a stop surface of the optical fiber of the optical plug to be coupled to it. Light is coupled to the transmitting and/or receiving module via the other end surface of the glass fiber. Embodiments of a coupling unit such as this are used, inter alia, in optoelectronic transceivers which are manufactured and marketed by Infineon Technologies AG under the designation "OC48 SFF(P)— Transceiver".

However, a coupling unit such as this is relatively expensive to produce and requires a relatively large amount of assembly effort. The end surface of the highly polished glass fiber which makes direct contact with the optical fiber in the optical plug must have a very high quality. In addition, the diameter of the ceramic pin into which the highly polished glass fiber is adhesively bonded must be formed with a precision of a few micrometers. A large number of high-precision, relatively expensive individual parts are required.

SUMMARY OF THE INVENTION

It is accordingly an object of the invention to provide a coupling unit for coupling an optical transmitting and/or receiving module to an optical fiber, which overcomes the above-mentioned disadvantages of the prior art apparatus of this general type.

In particular, in view of the background of the prior art, the present invention is based on the object of providing a coupling unit for coupling an optical transmitting and/or receiving module to an optical fiber, which is simple and cost-effective to produce and which also has the advantages of known coupling units.

With the foregoing and other objects in view there is provided, in accordance with the invention, a coupling unit including: a connecting area for connecting to a transmitting and/or receiving module; a holding area for holding an optical fiber; and a transparent coupling area for directly coupling light between the optical fiber and the optical transmitting and/or receiving module when the optical fiber is inserted into the holding area and the optical transmitting and/or receiving module is connected to the connecting area. The transparent coupling area is formed integral with the holding area and the connecting area.

The inventive solution is distinguished by a transparent coupling area formed as an integral component of the coupling unit and via which light is coupled directly between an optical fiber, which is inserted into the holding area of the coupling unit, and a transmitting and/or receiving module which is coupled to the connecting area of the coupling unit. The solution accordingly does not require any additional glass fiber to be incorporated in the coupling unit. Instead of this, a transparent coupling area, which is an integral component of the coupling unit, carries out the function of the glass fiber that was provided in the prior art. In this way, the coupling unit requires fewer parts and can be produced more easily and more cost-effectively.

In accordance with an added feature of the invention, the side of the coupling area which faces the holding area is in the form of a projecting stop surface for an optical fiber which is inserted into the holding area. This stop surface makes direct contact with the fiber core of the optical fiber that is inserted into the holding area of the coupling unit. The stop surface in this case preferably runs at right angles to the longitudinal axis of the holding area and of the optical fiber to be coupled to it. The end surface of the optical fiber likewise runs in a corresponding manner at right angles to the beam direction.

In a further preferred refinement, the coupling area has a refractive index that is matched to the refractive index of an inserted optical fiber. This allows back reflections of the light, which emerges from the optical fiber, of less than −27 dB to be achieved.

On its side facing the transmitting and/or receiving module, the coupling area preferably has an inclined light inlet or light outlet surface. The alignment at an angle to the beam direction further minimizes reflections back into the fiber and allows back reflections such as these to be reduced to a value of between −30 dB and −40 dB.

The coupling unit is advantageously in the form of an injection-molded part composed of transparent plastic, that is to say it is formed from a plastic that is transparent for the wavelengths that are used. Designing the coupling unit as an injection-molded part allows it to be produced particularly cost-effectively. The commercially available plastics, sold under the trademarks Apec 2000 and Apec DP1 9389 from Bayer AG, the plastic sold under the trademark Topas 6017 from Hoechst AG, or the plastic sold under the trademark Arton from the JSR Corporation, Japan may, for example, be used as plastics.

In one preferred refinement of the invention, the coupling area is formed in a horizontally running base plate. The upper face of the base plate is connected to the holding area which runs essentially at right angles to it. The lower face of the base plate is connected to the connecting area. The holding area is in this case preferably an elongated sleeve with a precision guide, which is used to hold a ceramic ferrule that contains the optical fiber to be coupled to it. The ceramic ferrule together with the optical fiber is a component of an optical plug that is known per se.

The connecting area of the coupling unit is preferably designed to be essentially cylindrical and is preferably used for connecting the coupling unit to a transmitting and/or receiving module that is arranged in a TO can. The coupling unit is preferably adjusted with and firmly bonded to the TO module. Latching elements and passive adjustment elements can be provided for this purpose. The ferrule is then introduced together with the optical fiber into the holding area of the coupling unit.

Other features which are considered as characteristic for the invention are set forth in the appended claims.

Although the invention is illustrated and described herein as embodied in a coupling unit for coupling an optical transmitting and/or receiving module to an optical fiber, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
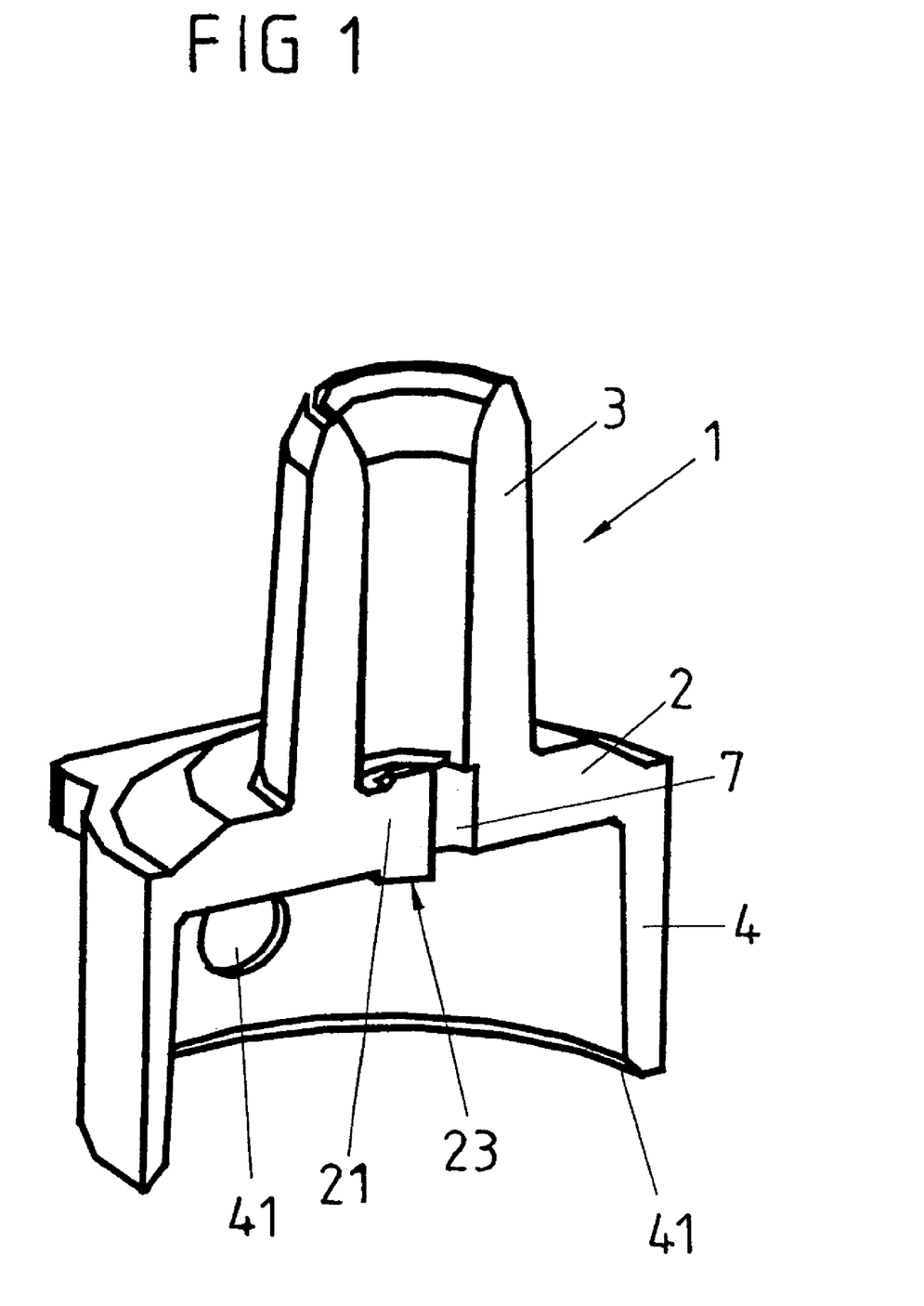
FIG. 1 is a perspective view of a portion of a coupling unit for coupling an optical transmitting and/or receiving module to an optical fiber.

Referring now to the figures of the drawing in detail and first, particularly, to FIG. 1 thereof, there is shown a coupling unit 1 constructed in the form of an injection-molded part. All the components of the coupling unit 1 are accordingly integral components of the coupling unit 1. Plastic materials, in particular, commercially available polymers that are available under the trademarks "APEC 2000", "APEC DP1 9389", "TOPAS 6017" or "ARTON" are used to construct the coupling unit 1. The refractive index of these plastics is between the value of 1.4 and a value of 1.56, and is thus in the same range as the refractive index of glass.

The coupling unit 1, which is in the form of an injection-molded part, is formed from a base plate 2 to which a holding area 3 and a connecting area 4 are connected, in opposite directions.

The holding area 3 is in the form of an elongated sleeve which provides a precision guide for a plug ferrule which can be inserted into the elongated sleeve. Such a plug ferrule has a central single-mode glass fiber (not illustrated). The end surface of the glass fiber is in this case polished, together with the end surface of the plug ferrule, at right angles to the beam direction or longitudinal axis of the glass fiber.

Figure 5:
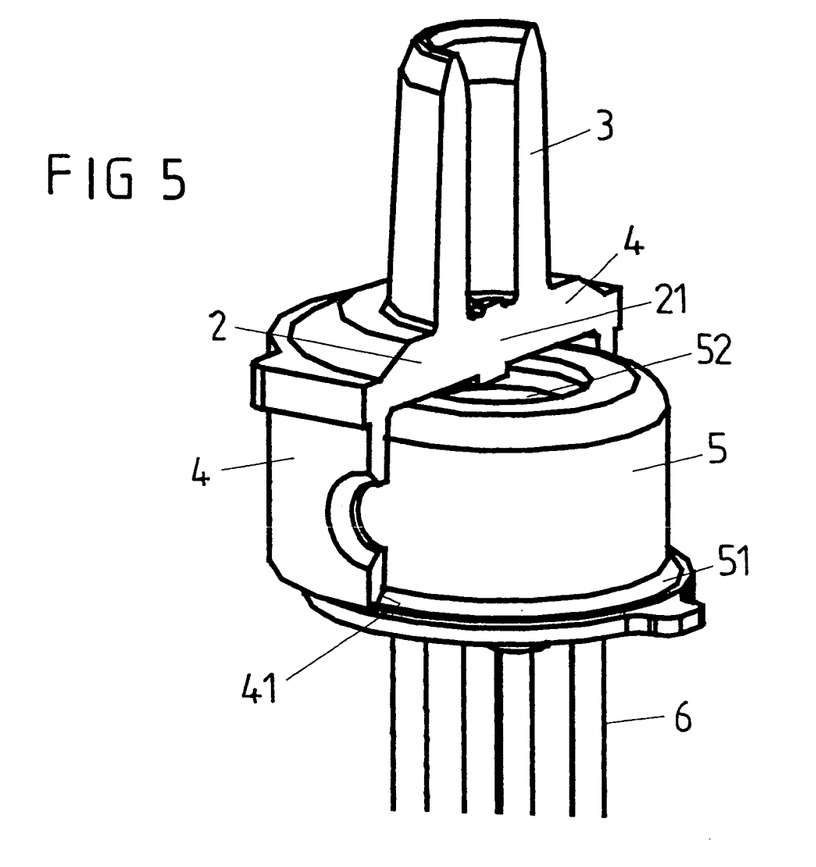
FIG. 5 is a perspective, partially cut away illustration of the coupling unit shown in FIGS. 1 to 4 in conjunction with a TO module.

The cylindrical connecting area 4 of the coupling unit 1 is used for holding and coupling a TO standard module which is illustrated in FIG. 5, is known per se, and contains an optical transmitting unit and/or an optical receiving unit. The optical transmitting unit is, in particular, a laser diode and the optical receiving unit is, in particular, a monitor diode. The TO module 5 is driven electrically via connecting legs 6.

The coupling unit 1 is adjusted with respect to the TO module 5, and is firmly adhesively bonded to it, via the connecting area 4. An opening 141 is provided for this purpose in the connecting area 4, through which an adhesive can be inserted into the space between the connecting area 4 and the housing of the TO module 5. The coupling unit 1 can be adjusted with respect to the TO module 5 actively or alternatively by using passive adjustment marks. A passive adjustment mark such as this is represented, for example, by the inclined lower edge 41 of the connecting area 4, which comes to rest on an edge 51 of the TO module 5 that is provided with a corresponding incline. The coupling unit 1 is supported with respect to the TO can 5 via the edges 41, 51.

The base plate 2, which runs essentially at right angles to the beam direction, extends between the holding sleeve 3 and the cylindrical connecting area 4 for coupling to a TO module 5. As can be seen in particular from the section illustrations in FIGS. 2 and 3, the base plate 2 forms a coupling area 21, which is used for directly coupling light between a glass fiber, which is inserted into the coupling sleeve 3, and a transmitting and/or receiving unit in the TO module 5.

Figure 2:
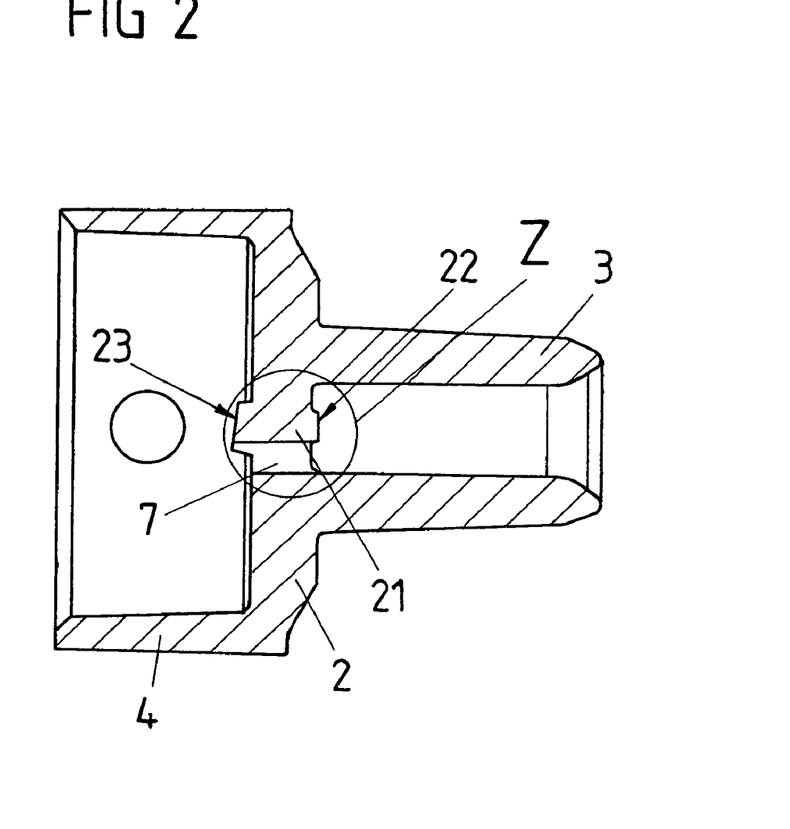
FIG. 2 is a cross-sectional view taken along the longitudinal direction of the coupling unit shown in FIG. 1.
Figure 3:
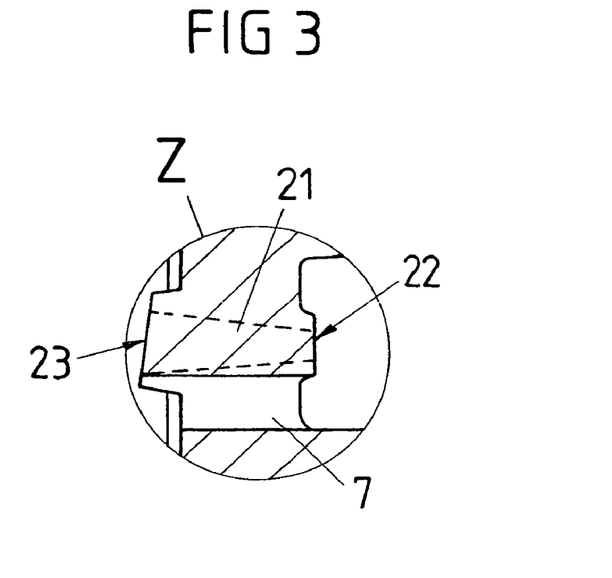
FIG. 3 is an enlarged illustration of the detail Z from FIG. 2.

For this purpose, the coupling area 21 has a stop surface 22, which faces the holding sleeve 3 and projects slightly beyond the base plate 2, and a light inlet/light outlet surface 23 which faces the TO module. The stop surface 22 runs at right angles to the beam direction of a ferrule, which is inserted into the holding sleeve 3, and of an optical fiber, and is formed centrally with respect to the holding sleeve 3. The end surface of the fiber core of a glass fiber which is inserted into the holding sleeve 3 in this case makes direct contact (physical contact) with the stop surface 22 of the coupling area 21. In this case, the end surface of the glass fiber may have a slight spherical bulge, in a manner which is known per se.

The plastic material of the coupling area 21 (and the entire coupling unit 1) has a refractive index which is matched to the refractive index of an optical fiber which is inserted into the coupling sleeve 3 and whose end surface rests on the stop surface 22, that is to say the refractive index of the plastic material of the coupling area 21 is the same as, or is only slightly different than the refractive index of the fiber core. This keeps reflections on the end surface of the optical fiber to be coupled to it as low as possible, and reduces this to values of −27 dB or less. Plastic materials with an appropriate refractive index were mentioned in the introduction. Plastic materials such as these can also be injection molded, so that the coupling unit 1 can be produced cost-effectively and easily.

In order to ensure a direct contact between the end surface of the fiber core of a glass fiber which is inserted into the holding sleeve 3 and the stop surface 22 of the coupling area 21 of the coupling unit 1, the invention provides for a spring force to act in a manner which is known per se on the plug ferrule which contains the glass fiber. This spring force is produced by an optical plug that contains the plug ferrule together with the optical fiber. Alternatively and/or in addition, the holding sleeve 3 may be in the form of a slotted sleeve which exerts a radial spring force on an inserted plug ferrule. Other devices can also be integrated in the coupling unit to ensure a firm connection and retention of a ferrule/ optical fiber in the holding sleeve 3, for example a transverse hole in the sleeve 3 for inserting an adhesive or for inserting a fixing screw.

The light inlet/light outlet surface 23 on the lower face of the coupling area 21 facing the TO module 5 is inclined with respect to the beam direction. This further minimizes reflections back into the optical fiber to be coupled to it.

Direct light coupling between an optical fiber which is inserted into the holding sleeve 3 and a transmitting and/or receiving unit in the TO module 5 is thus provided via the coupling area 21 and the two surfaces 22, 23 which bound the coupling area 21. The light which enters or emerges from the light inlet/light outlet surface 23 is in this case injected into the TO module 5, and is output from it, via a window 52. There is no need to use any additional optical fiber adhesively bonded into the coupling unit.

It should be mentioned that a cutout 7 that passes all the way through it is formed in the base plate 2 adjacent to the coupling area 21. However, the cutout 7 does not have any functional role with regard to light coupling. It is provided for manufacturing reasons, in order to make it possible to form the projecting structures of the stop surface 22 and of the light inlet/light outlet surface 23 with high precision when using injection molding.

Figure 4:
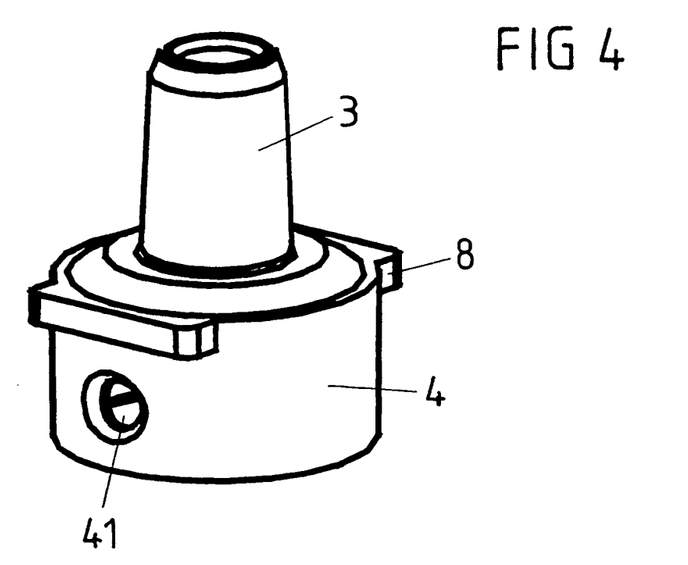
FIG. 4 is a perspective illustration of the coupling unit shown in FIGS. 1 to 3.

As is shown in FIG. 4, grip areas 8 which are used for holding and adjusting the coupling unit with respect to the TO module are provided on the circumferential side in the area of the base plate 2.

The described coupling arrangement is preferably used for coupling an optical fiber to a receiving module. However, particularly when the transmission power levels are low, it can be used just as well for coupling light from a transmitting module into an optical fiber.

The embodiment of the invention is not restricted to the exemplary embodiment described above. For example, it is possible to provide coupling to a transmitting and/or receiving module which is in some other form than a TO configuration, and with the connecting area 4 then being designed in a correspondingly different manner. In general, the connecting area may have any form which allows some connection of this type to a transmitting and/or receiving module. For example, it may be just a planar boundary surface which can be adhesively bonded to a transmitting and/or receiving module.

It is also possible to provide for additional light forming elements, in particular lenses, to be integrated in the coupling area 21 of the coupling unit 1. Light forming elements such as these may be formed on the surface of the coupling area and/or on internal cavities in the coupling area.

In a further alternative refinement, the stop surface 22 of the coupling area 21 is not formed such that it projects, but runs in the plane of the base plate 2.

The holding area 3 may also be formed in some other way than that illustrated in the figures, depending on the configuration of the optical plug to be coupled to it.

We claim:

1. A coupling unit, comprising:
   a connecting area for connecting to a transmitting and/or receiving module;
   a holding sleeve configured to receive an optical fiber within the holding sleeve; and
   a transparent coupling area configured for directly contacting the optical fiber and for directly coupling light between the optical fiber and the optical transmitting and/or receiving module when the optical fiber is inserted into said holding sleeve and the optical transmitting and/or receiving module is connected to said connecting area; and
   a horizontally running base plate formed with said coupling area therein, said base plate having an upper face connected to said holding sleeve, a lower face connected to said connecting area, and a cutout passing through said base plate;
   said transparent coupling area formed integral with said holding sleeve and said connecting area.

2. The coupling unit according to claim 1, wherein:
   said coupling area has a side facing said holding sleeve that forms a projecting stop surface for the optical fiber; and
   said stop surface is for directly contacting a fiber core of the optical fiber when the optical fiber is inserted into said holding sleeve.

3. The coupling unit according to claim 2, wherein:
   said holding sleeve defines a longitudinal axis; and
   said stop surface runs at right angles to said longitudinal axis of said holding sleeve.

4. The coupling unit according to claim 1, in combination with the optical fiber, wherein:
   the optical fiber has a refractive index; and
   said coupling area has a refractive index matched to the refractive index of the optical fiber.

5. The coupling unit according to claim 1, wherein:
   said coupling area has a side facing the transmitting and/or receiving module; and
   said side facing the transmitting-and/or receiving module has an inclined light inlet or light outlet surface.

6. The coupling unit according to claim 1, wherein said transparent coupling area; said holding sleeve, and said connecting area form a transparent, plastic injection-molded part.

7. The coupling unit according to claim 1, further comprising:
   a horizontally running base plate formed with said coupling area therein;
   said base plate having an upper face connected to said holding sleeve;
   said holding sleeve extending essentially at right angles with respect to said upper face of said base plate; and
   said base plate having a lower face connected to said connecting area.

8. The coupling unit according to claim 1, wherein said holding sleeve forms an elongated sleeve with a precision guide.

9. The coupling unit according to claim 1, wherein said holding sleeve is designed for holding a ceramic ferrule having a center configured with the optical fiber.

10. The coupling unit according to claim 1, wherein said connecting area is essentially cylindrical.

11. The coupling unit according to claim 10, wherein said connecting area is designed for connecting to a TO can in which the transmitting and/or receiving module is configured.

12. The coupling unit according to claim 1, further comprising:
   said holding sleeve extending essentially at right angles with respect to said upper face of said base plate; and
   said cutout running adjacent said coupling area of said base plate.

13. A coupling unit comprising:
   a substantially cylindrical holding sleeve configured to receive an optical fiber within the holding sleeve;

a substantially cylindrical connecting area configured to receive an optical module within the connecting area, the connecting area further configured to optically align the optical module with the optical fiber when the optical fiber is inserted into said holding sleeve;

a coupling area configured to couple light between the optical fiber and the optical module when the optical fiber is inserted into the holding sleeve and the optical module is received within the connecting area, wherein the coupling area is formed integral with the holding sleeve and connecting area and a common axis is shared by the holding sleeve and the connecting area; and a cutout through a base plate, wherein the cutout extends form the holding sleeve to the coupling area along side the coupling area.

14. The coupling unit according to claim 13, wherein the holding sleeve, connecting area, and coupling area are made from a transparent plastic material using an injection-molding process.

15. The coupling unit according to claim 13, wherein the coupling area is transparent and has a refractive index substantially matched to a refractive index of the optical fiber.

16. The coupling unit according to claim 13, wherein the optical module is a TO can and the connecting area receives the TO can and the TO can is secured to inner walls of the connecting area.

17. The coupling unit according to claim 13, wherein said connecting area is substantially cylindrical and has an inner diameter that is sized to substantially conform to the outer diameter of the module.

18. The coupling unit according to claim 13, wherein:

said coupling area has an inclined surface configured to reflect light away from both the module and the fiber.

* * * * *

UNITED STATES PATENT AND TRADEMARK OFFICE
CERTIFICATE OF CORRECTION

PATENT NO. : 7,182,525 B2  Page 1 of 3
APPLICATION NO. : 10/676589
DATED : February 27, 2007
INVENTOR(S) : Bergmann et al.

It is certified that error appears in the above-identified patent and that said Letters Patent is hereby corrected as shown below:

The title page showing the illustrative figure should be deleted to be replaced with the attached title page.

The drawing sheet, consisting of Fig. 1, should be deleted to be replaced with the drawing sheet, consisting of Fig. 1, as shown on the attached page.

Drawings
Sheet 1, FIG 1, change the reference to the opening of the coupling unit from "41" to --42--

Signed and Sealed this

Eighth Day of June, 2010

David J. Kappos
*Director of the United States Patent and Trademark Office*

CERTIFICATE OF CORRECTION (continued)
U.S. Pat. No. 7,182,525 B2

Sheet 3, FIG 4, change the reference "41" to --42--

Column 4
Line 6, change "141" to --42--

(12) United States Patent
Bergmann et al.

(10) Patent No.: US 7,182,525 B2
(45) Date of Patent: Feb. 27, 2007

(54) COUPLING UNIT FOR COUPLING AN OPTICAL TRANSMITTING AND/OR RECEIVING MODULE TO AN OPTICAL FIBER

(75) Inventors: Frank Bergmann, Berlin (DE); Andreas Stockhaus, Berlin (DE); Michael-Peter Pohnke, Berlin (DE); Andreas Steffensen, Kleinmachnow (DE)

(73) Assignee: Finisar Coproration, Sunnyvale, CA (US)

( * ) Notice: Subject to any disclaimer, the term of this patent is extended or adjusted under 35 U.S.C. 154(b) by 69 days.

(21) Appl. No.: 10/676,589

(22) Filed: Oct. 1, 2003

(65) Prior Publication Data
US 2004/0062492 A1 Apr. 1, 2004

(30) Foreign Application Priority Data
Oct. 1, 2002 (DE) ............................. 102 46 532

(51) Int. Cl.
*G02B 6/36* (2006.01)

(52) U.S. Cl. .......................................... 385/88

(58) Field of Classification Search ............ 385/53–94
See application file for complete search history.

(56) References Cited

U.S. PATENT DOCUMENTS

| | | | | |
|---|---|---|---|---|
| 5,274,723 A | * | 12/1993 | Komatsu | 385/92 |
| 6,491,447 B2 | * | 12/2002 | Aihara | 385/92 |
| 6,607,309 B2 | * | 8/2003 | Kuhn et al. | 385/93 |
| 6,793,406 B1 | * | 9/2004 | Edwards et al. | 385/88 |
| 6,860,649 B2 | * | 3/2005 | Edwards et al. | 385/92 |
| 7,036,998 B2 | * | 5/2006 | Tonai et al. | 385/88 |

FOREIGN PATENT DOCUMENTS

| | | |
|---|---|---|
| DE | 33 16 236 A1 | 8/1984 |
| DE | 38 34 394 A1 | 4/1990 |
| DE | 38 34 395 A1 | 4/1990 |

* cited by examiner

*Primary Examiner*—Sung Pak
*Assistant Examiner*—Tina M. Wong
(74) *Attorney, Agent, or Firm*—Workman Nydegger (57) ABSTRACT

The invention relates to a coupling unit for coupling an optical transmitting and/or receiving module to an optical fiber. The coupling unit has a connecting area that can be connected to a transmitting and/or receiving module, and a holding area that holds an optical fiber. A transparent coupling area is provided, which is formed as an integral component of the coupling unit, and via which light can be coupled directly between an optical fiber that is inserted into the holding area and a transmitting and/or receiving module that is coupled directly to it. The coupling area preferably has a matched refractive index. The coupling unit is preferably in the form of an injection-molded part.

18 Claims, 3 Drawing Sheets